Jan. 13, 1942.  J. L. ANDERSON  2,269,505
CIRCLE CUTTING MACHINE
Filed May 7, 1940  3 Sheets-Sheet 1

INVENTOR
James L. Anderson
BY
ATTORNEY

Patented Jan. 13, 1942

2,269,505

UNITED STATES PATENT OFFICE 2,269,505

CIRCLE CUTTING MACHINE

James L. Anderson, Closter, N. J., assignor to Air Reduction Company, Incorporated, New York, N. Y., a corporation of New York Application May 7, 1940, Serial No. 333,718

11 Claims. (Cl. 266—23)

This invention relates to machines for cutting circles, and more especially to machines that are supported on the work itself or some adjacent underlying surface.

It is an object of the invention to provide an improved circle cutting machine which is simple, compact, efficient and convenient to operate.

The invention comprises a stationary frame with three legs by which it is stably supported. The frame is open at the center so that torches can be adjusted to cut circles down to zero radius. Some features of the invention relate to provisions for cutting circles with circumferences under the supporting frame as well as inside and outside of the frame. In order to cut circles with this wide range of diameters, the supporting legs are made adjustable so that the circle defined by points where the legs touch the underlying support can be changed in size so as not to coincide with, or even approximate the circle to be cut.

Another object of the invention is to provide improved centering means for a circle cutting machine which is adjustable to cut circles down to zero radius. It is not possible in such machines to have a permanently located center post because the post would offer an obstruction to the torch when cutting circles of very small diameter.

The centering device of this invention is a permanent part of the machine which is quickly and conveniently movable between a centering position and a retracted position away from the center of the work and the open middle of the frame.

Other objects, features and advantages of the invention will appear or be pointed out as the specification proceeds.

In the accompanying drawings, forming part hereof:

Figure 3:
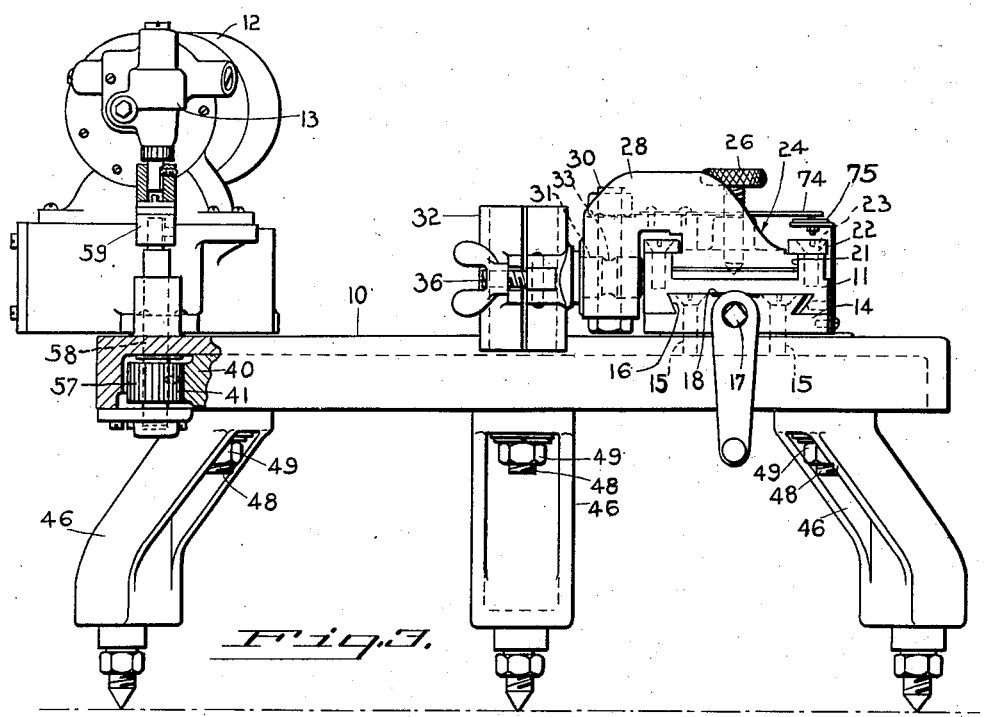
Fig. 3 is a side elevation, partly broken away, of the machine shown in Fig. 1, when viewed from the right.

The cutting machine includes a frame or housing 10 on which is supported a slide 11 and a motor 12 with reduction gearing 13. The slide 11 rests on an arm or guide 14, (Fig. 3), that is fastened to the frame or housing 10 by screws 15. The slide 11 is held on the guide 14 by a gib 16 and is adjusted lengthwise along the slide by a lead-screw 17 that rotates in bearings in the guide 14 and threads through a lug 18 depending from the slide 11 into a slot in the guide.

A channel 21 in the top surface of the slide 11 has strips 22 fastened to its top edges by screws 23. The strips 22 overlie the sides of the channel 21 and form with the channel an undercut guide in which blocks 24 are slidably held. Each block 24 can be locked against movement with respect to the slide 11 by means of a set-screw 26 that threads through a boss on the block 24 and clamps against a bearing that extends along the bottom of the channel 21.

Figure 1:
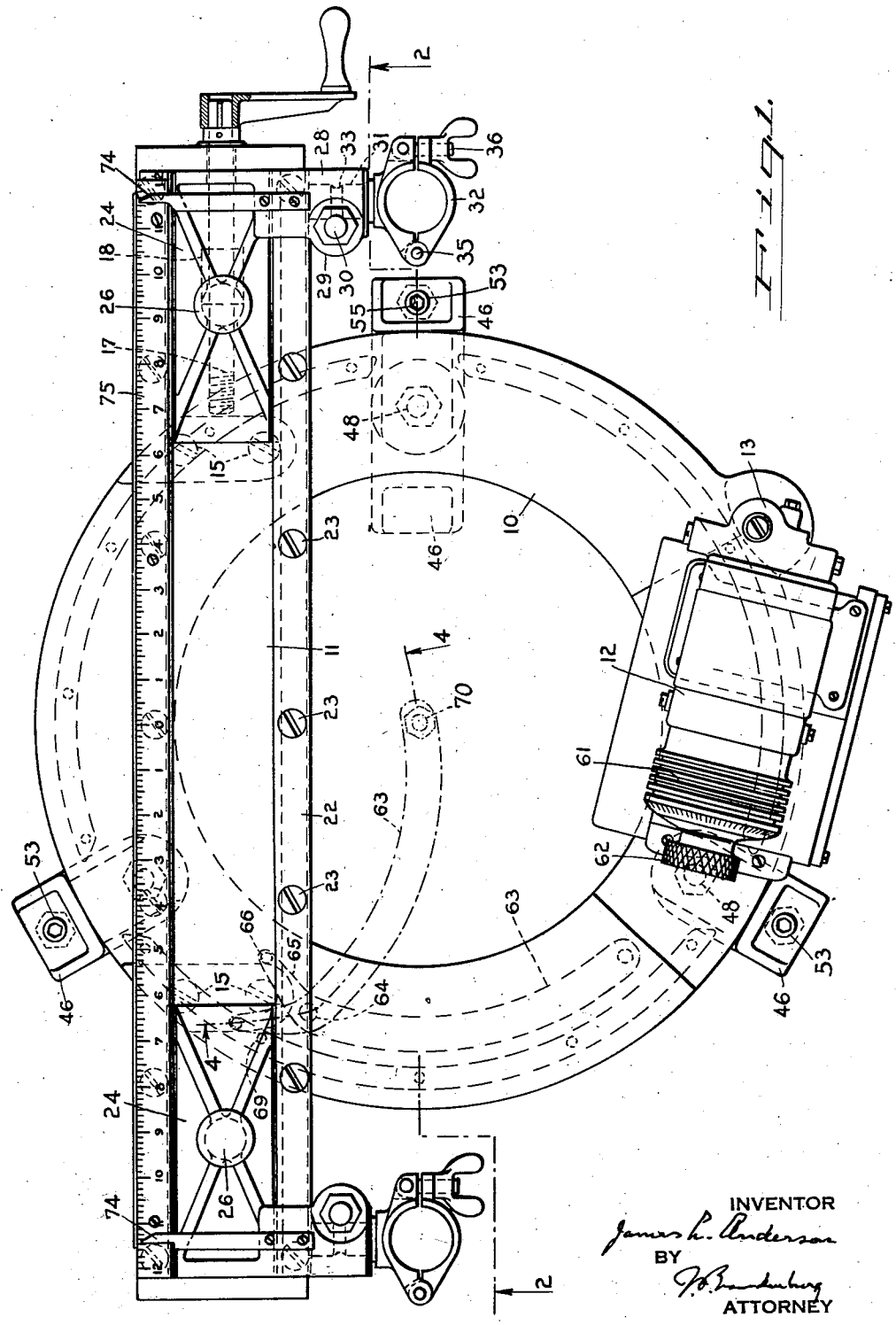
Fig. 1 is a top plan view of a cutting machine embodying the invention.
Figure 2:
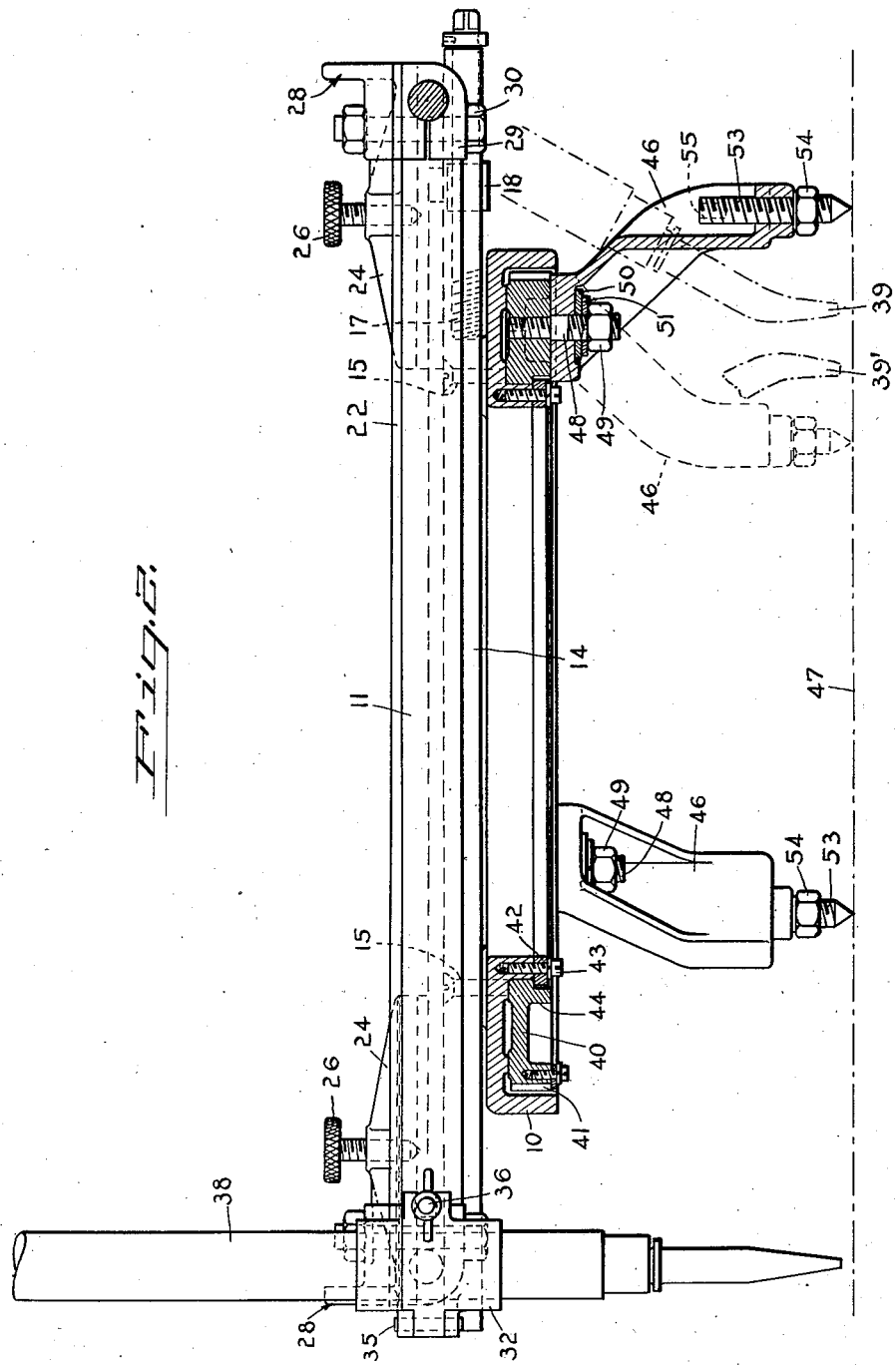
Fig. 2 is a sectional view taken on the line 2—2 of Fig. 1, with the adjusting crank removed and with the torches shown in position.

A bracket 28 secured to each of the blocks 24 has its end formed into a split clamp 29, best shown in Fig. 2. The split clamp 29 can be tightened by a bolt 30. A stem 31 of a torch-holder 32 fits into the clamp 29 and is held against axial displacement, even when the clamp is loosened to permit the stem 31 to turn, by the bolt 30 which passes through a peripheral groove 33 (Fig. 1) in the stem and thus serves as a dowel to retain the stem 31 in the clamp 29.

The torch-holder 32 comprises two sections hinged together by a pivot 35 and clamped against the side of the torch by a bolt 36. There is similar torch-supporting structure at both ends of the slide 11 and the corresponding parts at both ends are indicated by the same reference characters.

An upright torch 38 (Fig. 2) is shown in the left-hand torch-holder 32. The right-hand torch-holder 32 is not shown in Fig. 2 because ahead of the irregular section line 2—2 of Fig. 1, but when the machine is set up the right-hand torch-holder has its stem 31 turned in the clamp 29 so that its torch 39 is supported at an angle. The tip of torch 39 is curved to compensate for the slope of the torch and projects its cutting jet straight down against the work.

The frame or housing 10 is of annular outline, as shown in Fig. 1, and is of inverted U cross-section, as illustrated by Fig. 2. The housing 10 covers a fixed frame 40 which has gear teeth 41 around its circumference. A ring 42 connected to the bottom of the inside wall of annular housing 10 by screws 43 extends under a flange 44 on the inside surface of the fixed frame 40 and holds the housing 10 on the fixed frame 40.

The housing 10 is a movable frame resting upon and supported by the fixed frame 40. The top surface of the fixed frame 40 forms an annular bearing with which an annular bearing of the housing 10 contacts. The inside cylindrical surface of the flange 44 serves as a bearing for preventing radial displacement of the housing 10 on the fixed frame 40. It is not necessary, however, that both the frame 40 and housing 10 have continuous bearing surfaces. A discontinuous surface on either can be used with a continuous annular bearing surface on the other.

The frame 40 has three legs 46 for stably supporting it on the work 47. The legs 46 are connected to the frame 40 by stud bolts 48 that thread into the frame 40 and have nuts 49 at their lower ends for clamping the upper ends of the legs 46 firmly against the under side of the frame 40. A plain washer 50 and lock washer 51 are clamped between the nut 44 and each of the legs 46.

A leveling screw 53 is threaded into the lower end of each of the legs 46 and held in any set position by a lock-nut 54. There is a socket 55 in the top of each screw 53 for receiving a tool to turn the screw. The purpose of the leveling screws 53 is to position the machine in such relation to the work that the axis of rotation of the movable frame or housing 10 is normal to the surface of the work to be cut, and the torch will therefore travel over the surface with the cutting tip at a constant spacing from the surface. Rotation about an axis oblique to the surface of the work would cause the torch to move progressively closer to the work during one-half of a revolution and further from the work during the other half.

Each leg 46 is offset. It contacts with the work outside of a projection of the frame 40 in the work when in the full-line position shown in Fig. 2. If the nut 49 is loosened and the leg 46 turned inward, it occupies the position shown in dotted lines. With all of the legs 46 in this position, the circle defined by the points of contact of the machine on the work is smaller in diameter than the open space inside the annulus formed by the housing 10.

For cutting circles larger than the outside diameter of the housing 10, the torch 38 is located as shown in Fig. 2. If all of the legs 46 are turned in (dotted line position), the torch 38 can be adjusted to cut circles of larger or smaller radii, the lower limit being determined by the position where the torch or torch-holder comes against the housing 10. For cutting smaller circles having a diameter close to or between the inside and outside diameters of the annular housing 10, the torch 39 is used.

Either of the torches 38 or 39 may be put into the space inside of annulus formed by the housing 10. The torch-holder 32 is first disconnected from the clamp 29. The slide 11 is then shifted to move either the right- or left-hand end of the slide into position where the clamp 29 is over the open space in the center of the machine. The torch-holder 32 with the torch in it is then connected with the clamp 29 and can be shifted toward and from the center of rotation. Since the torch can be moved all the way to the center of rotation, it is possible to cut a circle of as small a diameter as desired.

The torch 39 can be turned either way in its torch-holder and the holder turned in clamp 29 to change the slope so that the torch 39 extends under the frame 40 from either outside or inside the annulus formed by the frame 40 and housing 10. The lower end of the torch 39 is shown in such a position in Fig. 2 and indicated by the reference character 39'.

A gear 57 (Fig. 3) is fixed on a shaft 58 that turns in bearings in the housing 10. The upper end of the shaft 58 is connected by a coupling 59 with the reduction gearing 13 of the motor 12. The gear 57 meshes with the teeth on the circumference of the fixed frame 40, and when driven by the motor travels around the frame 40 and causes rotation of the housing 10 and the torch-supporting structure mounted on the housing.

With any given speed of rotation of the housing 10, the lineal speed of the torch tip depends upon its distance from the center of rotation. In order to provide for adjustment of the torch speed, the motor 12 is equipped with a centrifugal governor 61 (Fig. 1) controlled by a knob 62 in a manner well understood in the art.

Figure 4:
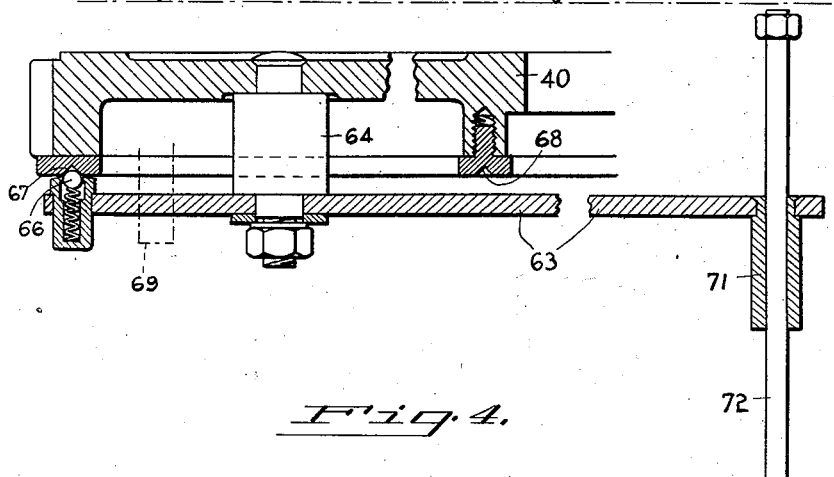
Fig. 4 is an enlarged sectional view taken on the line 4—4 of Fig. 1.

The machine is equipped with a center locater so that circles can be cut around a definite point in the work. The center locater includes an arcuate arm 63 connected to the under side of the frame 40 by a pivot 64. The arm 63 has a tail portion 65 that carries a spring-pressed ball latch 66, best shown in Fig. 4, that enters a recess 67 to hold the arm in its extended position and a recess 68 to hold the arm in its folded position under the frame 40.

In addition to these recesses 67 and 68 which serve as stops and hold the arms 63 in the positions at the extremes of its travel, there is a pin 69 extending downward from the frame 40 and serving as a positive stop to prevent further movement of the arm 63 when it reaches a desired position over the center on the work about which the cut is to be made.

A bushing 71 secured to the arm 61 provides a long bearing for a center locater pin 72. The substantial length of the bearing in the bushing 71 is advantageous because it maintains the pin 72 in alinement with the axis of the bearing in the bushing. The lower end of the pin 72 is pointed and when the arm 63 is in the extended position shown in dot-and-dash lines in Fig. 1 the axis of the pin 72 is coincident with the common axis of the annuli formed by the frame 40 and housing 10, which axis is the center of rotation about which the torches are moved. The pin 72 is withdrawn from the bushing 71 when the arm 63 is to be folded back into the dotted-line position of Fig. 1.

On each of the blocks 24 there is a pointer 74 (Figs. 1 and 3) that moves along a scale 75 attached to the guide 14. The position of the pointer 74 along the scale indicates the radius of the circle that will be cut by an upright torch when the block is in that position. With the torch sloping, as in the case of the torch 39 in Fig. 2, allowance must be made for the amount that the tip is offset by the slope of the torch.

The invention is not limited to the embodiment illustrated and described. Changes and modifications can be made and some features of the invention can be used without others.

I claim:

1. A circle cutting machine comprising an annular frame with three legs for stably supporting and positioning the machine on the surface of the work, a torch-supporting frame that fits over the annular frame and turns on said annular frame as a bearing, and driving means including a motor carried by the torch-supporting frame and mechanism operated by the motor for moving the torch-supporting frame on said annular frame.

2. A circle cutting machine comprising a stationary annular frame with legs that support it from the work or other underlying surface, a movable annular frame that fits over the stationary frame as a housing, an annular bearing on one of said frames by which the movable frame is supported for rotation on the stationary frame, said annular bearing being enclosed and protected by the housing, a torch-support on the movable frame, and driving mechanism for causing the movable frame to move on the stationary frame, at least a part of said driving mechanism being enclosed and protected by said housing.

3. In a circle cutting machine including an annular frame with a bearing on which torch-supporting structure turns about the center of the annular frame, three supporting legs under the annular frame, releasable means connecting each of the legs to the annular frame, said legs being offset and movable to shift the offset toward or from the axis of rotation, and the offset portion of each of said legs being of sufficient height to provide clearance under the connecting means for the tip of a torch carried by said torch-supporting structure and avoid interference with the cutting operation when cutting circles of certain diameters.

4. In a circle cutting machine, a frame assembly, three legs secured to the frame assembly for stably supporting the machine on the surface of the work, and adjustable means supported by said assembly for moving a torch to cut circles both larger and smaller than the circle defined by the three points of contact of the legs on the work, said legs being movable with respect to the remainder of the machine in directions to change the diameter of the circle defined by said points of contact.

5. In a circle cutting machine, a frame supported by the work, a structure movable on said frame about an axis substantially normal to the work, means carried by said structure and movable to shift a torch along a diameter extending through said axis, and into position to cut a circle either larger or smaller than the frame, and means for moving a second torch along the same diameter from the opposite side of the machine.

6. A circle cutting machine including an annular frame, three offset legs connected to said frame at angularly spaced regions around the bottom face of said frame for stably supporting the machine on the surface of the work, a leveling screw at the bottom of each leg with a contact point at its lower end, each of said legs being adjustable with respect to the annular frame to change the direction of the offsets and thereby control the diameter of the circle defined by the points of contact of said legs on the work, an annular housing that fits over said frame, bearing surfaces in said housing in contact with the top and the inner faces of the frame, means on the housing extending under a portion of the frame to hold the housing and frame in assembled relation, a motor on the housing, gear teeth around the outer circumference of the frame, a gear journaled in the housing and meshing with the teeth on the frame, motion transmitting means including speed reducing gearing through which the motor drives said gear, torch-supporting means mounted on the housing and including a slide, torch-holders at opposite ends of the slide, and a lead-screw for moving the slide to shift the torch-holders toward and away from the center of rotation of the housing on the annular frame.

7. In a circle cutting machine, a frame with legs for stably supporting it on the surface of the work, the center region of said frame being open, torch-supporting means movable on the frame about an axis passing through the open space in the center region, and a center finder for locating the machine on the work, said center finder including an arm attached to the machine and pivoted to swing into a position where said arm passes through the axis of rotation of the torch-supporting means, a limit device for stopping the arm in such position, and means connected to the arm for indicating the center where said axis of rotation intersects the surface of the work.

8. In a circle cutting machine, a stationary annular frame, a torch-supporting frame movable on the stationary frame about the axis of the annulus as a center, legs on the stationary frame for supporting it on the work, a center finder including an arm pivoted to one of said frames, a device on the arm for indicating on the work the center of rotation of the movable frame, and a spring-pressed latch that stops and holds the arm when the center-indicating device is over said center of rotation.

9. In a circle cutting machine, an annular frame with a bearing surface for supporting a movable torch-carrying structure, and means for supporting said annular frame over the work, a center finder including an arcuate arm, a pivot connecting said arm to the frame for movement between a position under the annular frame and a position extending inward across the center axis of the annular frame, and limit devices for holding the arm in either of said positions.

10. A circle cutting machine including an annular frame with legs for supporting it on the work, and a torch-supporting structure movable on said annular frame about the center of the annulus, the torch-supporting structure including a torch-holder, and a support on which the torch-holder is movable, said support extending across the open space within the annulus and for a limited distance outside of the annulus.

11. In a circle cutting machine, an annular frame, adjustable offset legs connected to said frame for supporting it from the surface of the work to be cut, a movable frame supported by said annular frame for rotation about the center of the annulus, guide means carried by the movable frame and extending across the open center of the annulus and beyond the periphery of said annulus, and torch means carried by the guide means including a torch holder adjustable with respect to the movable frame toward and from the center of the annulus for cutting circles of different diameter, and a torch disposed in a sloping position so that it can extend under the annular frame when the machine is adjusted to cut a circle having a diameter between the inner and outer diameters of the annular frame.

JAMES L. ANDERSON.